United States Patent
Lee (10) Patent No.: US 8,662,270 B2
(45) Date of Patent: Mar. 4, 2014

(54) ACTUATOR FOR OPERATING A MULTI-DIRECTIONAL CLUTCH

(75) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 53 days.

(21) Appl. No.: 13/238,777

(22) Filed: Sep. 21, 2011

(65) Prior Publication Data
US 2012/0067686 A1 Mar. 22, 2012

Related U.S. Application Data

(60) Provisional application No. 61/384,753, filed on Sep. 21, 2010.

(51) Int. Cl.
*F16D 41/08* (2006.01)

(52) U.S. Cl.
USPC ............... 192/38; 192/44; 192/78; 192/114 R (58) Field of Classification Search
CPC ...... F16D 41/064; F16D 41/061; F16D 41/20
USPC ....................... 192/45.004, 45.014
See application file for complete search history.

(56) References Cited

U.S. PATENT DOCUMENTS

| | | | | |
|---|---|---|---|---|
| 4,987,790 A * | 1/1991 | Weismann | ...................... | 74/333 |
| 6,557,680 B2 | 5/2003 | Williams | | |
| 6,652,407 B2 * | 11/2003 | Ronk et al. | ..................... | 475/204 |
| 7,083,538 B2 * | 8/2006 | Szalony et al. | ............... | 475/149 |
| 7,415,905 B2 | 8/2008 | Maguire et al. | | |
| 7,874,414 B2 * | 1/2011 | Lee | ................. | 192/38 |
| 8,042,668 B2 | 10/2011 | Lee | | |
| 2005/0236246 A1 | 10/2005 | Joki et al. | | |
| 2008/0128233 A1 | 6/2008 | Joki et al. | | |

FOREIGN PATENT DOCUMENTS

WO  2005068867  7/2005

\* cited by examiner

*Primary Examiner* — David D Le
*Assistant Examiner* — Mark Manley
(74) *Attorney, Agent, or Firm* — Kevin L. Parks (57) ABSTRACT

An actuator for operating a multi-mode overrunning multi-directional clutch includes an axially displaceable shaft portion, an engagement member connected to the shaft portion and having a resilient segment for displacing a piston to engage the clutch. A locking portion is connected to the shaft portion for displacing an actuator pin to lock the clutch. In an example embodiment, the clutch is a three-mode overrunning bi-directional clutch. In some example embodiments, the resilient segment is radially flexible. In some example embodiments, the engagement member includes a tubular section with a plurality of circumferentially-offset axial slots, and the resilient segment is circumferentially disposed between corresponding axial slots.

16 Claims, 6 Drawing Sheets

ACTUATOR FOR OPERATING A MULTI-DIRECTIONAL CLUTCH

FIELD

Example aspects herein relate generally to an actuator for operating a bi-directional clutch, and, more specifically, to an actuator shaft for sequentially transitioning from, for example, a freewheel mode to a braking mode and a locking mode in a multi-mode, overrunning, multi-directional clutch.

BACKGROUND

Three-mode overrunning bi-directional clutches are known. One example is shown in commonly assigned United States Patent Application Publication No. 2008/0099294 entitled THREE-MODE OVERRUNNING BI-DIRECTIONAL CLUTCH, hereby incorporated by reference in its entirety as if set forth fully herein. In that application, a brake mode is engaged by a coaxially mounted conical hub or a plurality of hydraulic pistons with interconnecting hydraulic fluid channels.

SUMMARY

At least some example aspects herein broadly relate to an actuator for operating a multi-mode overrunning multi-directional clutch including an axially displaceable shaft portion, an engagement member connected to the shaft portion and with a resilient segment for displacing a piston to engage the clutch, and a locking portion connected to the shaft portion for displacing an actuator pin to lock the clutch. In an example embodiment, the clutch is a three-mode overrunning bi-directional clutch. In some example embodiments, the resilient segment is radially flexible. In some example embodiments, the engagement member includes a tubular section with a plurality of circumferentially-offset axial slots, and the resilient segment is circumferentially disposed between corresponding axial slots.

In an example embodiment, the resilient segment includes a circumferential surface having a profile, and at least a portion of the profile is arranged to apply an increasing force to the piston when the shaft portion is axially displaced relative to a hub for the clutch. Another portion of the profile is arranged to apply a constant force to the piston when the shaft portion is axially displaced relative to a hub for the clutch. In an example embodiment of the invention, the locking portion is arranged to displace the actuator pin.

Other example aspects relate to a multi-mode overrunning multi-directional clutch including a split tubular slipper ring with a surface having a plurality of recesses formed therein, and a hub concentric with the slipper ring and having a surface with a plurality of recesses formed therein. The clutch further includes a plurality of rollers disposed radially between the slipper ring and the hub in the slipper ring and hub recesses, a plurality of radially displaceable pistons for transmitting an applied radial force to the slipper ring, an actuator shaft with an engagement member for applying the radial force to the pistons for being transmitted to the slipper ring.

In an example embodiment, the clutch includes a radially displaceable actuator pin for selectively restricting relative circumferential motion between the slipper ring and the hub, and the actuator shaft includes a locking portion for displacing the actuator pin. In some example embodiments, the engagement member includes a radially flexible resilient segment. The engagement member includes a tubular section with a plurality of circumferentially-offset axial slots and the resilient segment is circumferentially disposed between corresponding axial slots. In an example embodiment, the resilient segment includes a surface with a profile, and at least a portion of the profile is arranged to apply an increasing force to the plurality of pistons when the actuator shaft is axially displaced relative to the hub. A portion of the profile is arranged to apply a constant force to the plurality of pistons when the actuator shaft is axially displaced relative to the hub.

Other example aspects herein broadly relate to a method of operating a slipper clutch including axially displacing a shaft to a first position, radially displacing a piston towards a slipper ring of the slipper clutch with a portion of the shaft to apply a radial force to the slipper ring to engage the clutch. In an example embodiment, the shaft includes a resilient segment for displacing the piston. In some example embodiments the method includes axially displacing the shaft to a second position and radially displacing an actuator pin away from the slipper ring to allow relative rotation between the slipper ring and a hub to lock the clutch. In an example embodiment, the actuator pin is disposed in a locking portion of the shaft.

BRIEF DESCRIPTION OF THE DRAWINGS

The nature and mode of operation of example aspects herein will now be more fully described in the following detailed description of such aspects taken with the accompanying drawing figures, in which.

DETAILED DESCRIPTION

Like drawing numbers appearing in different drawing views identify identical, or functionally similar, structural elements.

This invention is not limited only to the particular embodiments, methodology, materials and modifications described herein, and as such may, of course, vary. Also, the terminology used herein is for the purpose of describing particular example aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalents to those described herein can be used in the practice or testing of the invention, the following example methods, devices, and materials are now described.

Figure 1A:
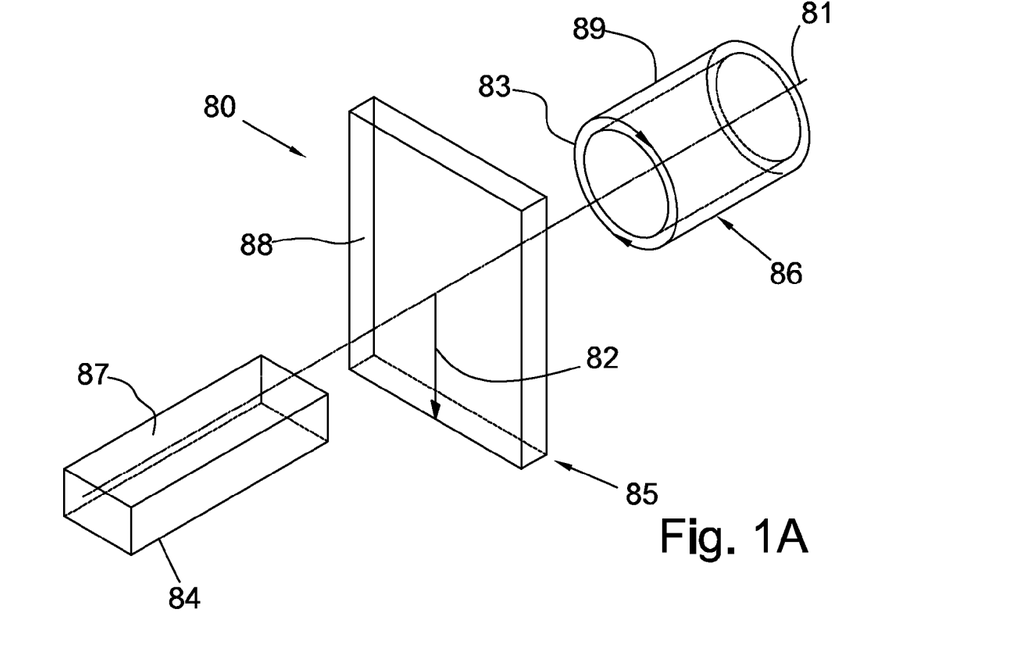
FIG. 1A is a perspective view of a cylindrical coordinate system demonstrating spatial terminology used herein.

FIG. 1A is a perspective view of cylindrical coordinate system 80 demonstrating spatial terminology used in the present description, which is at least partially described within the context of an example cylindrical coordinate system. System 80 has a longitudinal axis 81, used as a reference for directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
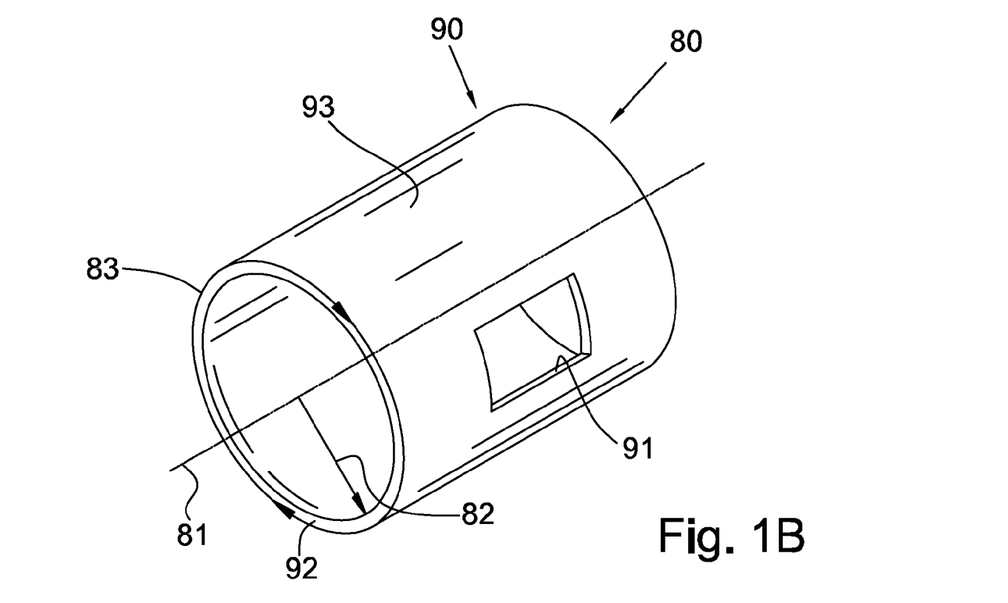
FIG. 1B is a perspective view of an object in the cylindrical coordinate system of FIG. 1A demonstrating spatial terminology used herein.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
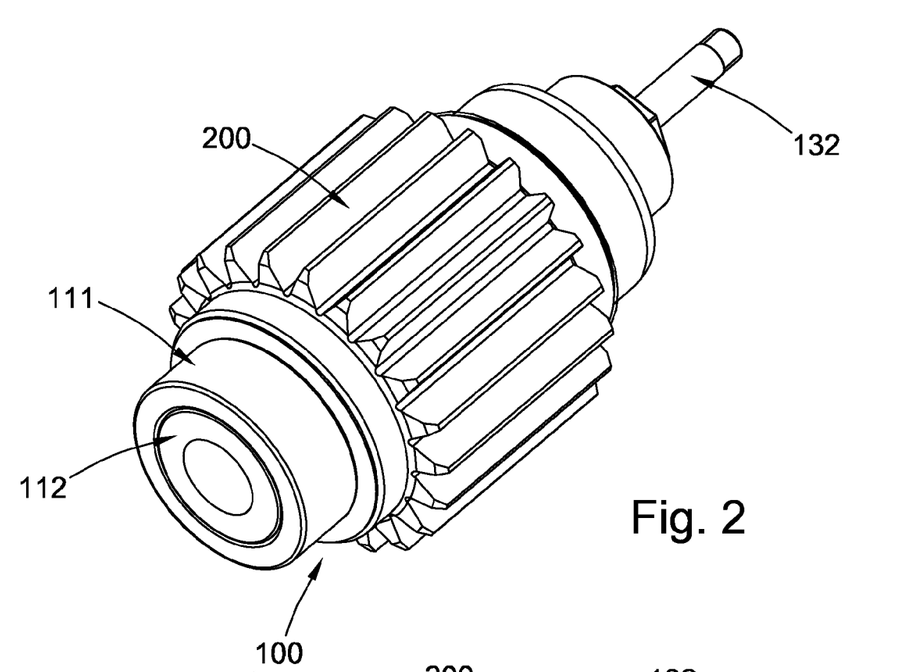
FIG. 2 is a perspective view of a bi-directional clutch assembled with a gear according to an example aspect herein.
Figure 3:
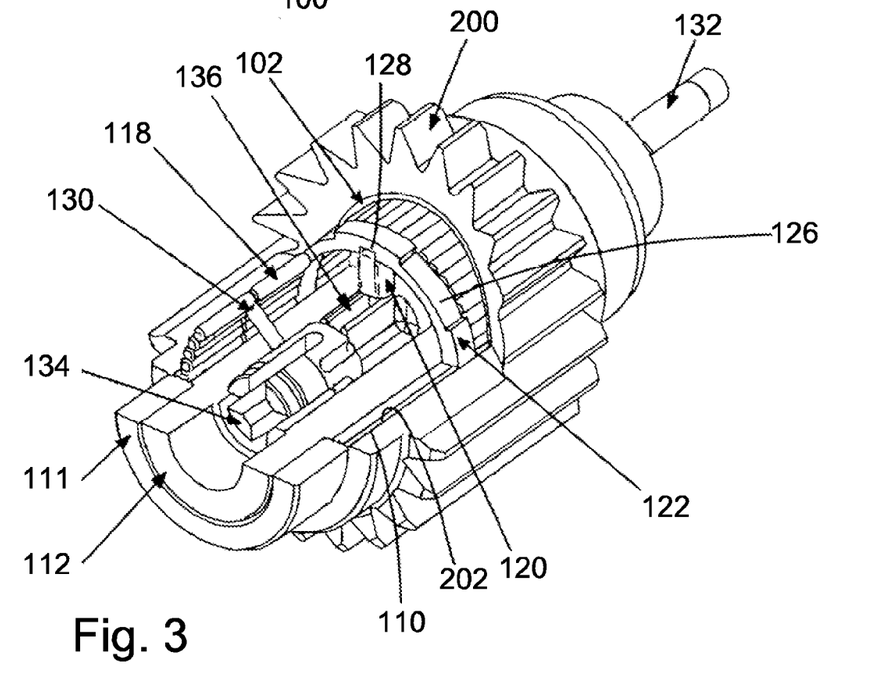
FIG. 3 is a view of the bi-directional clutch assembly of FIG. 2, shown with a section removed.
Figure 4:
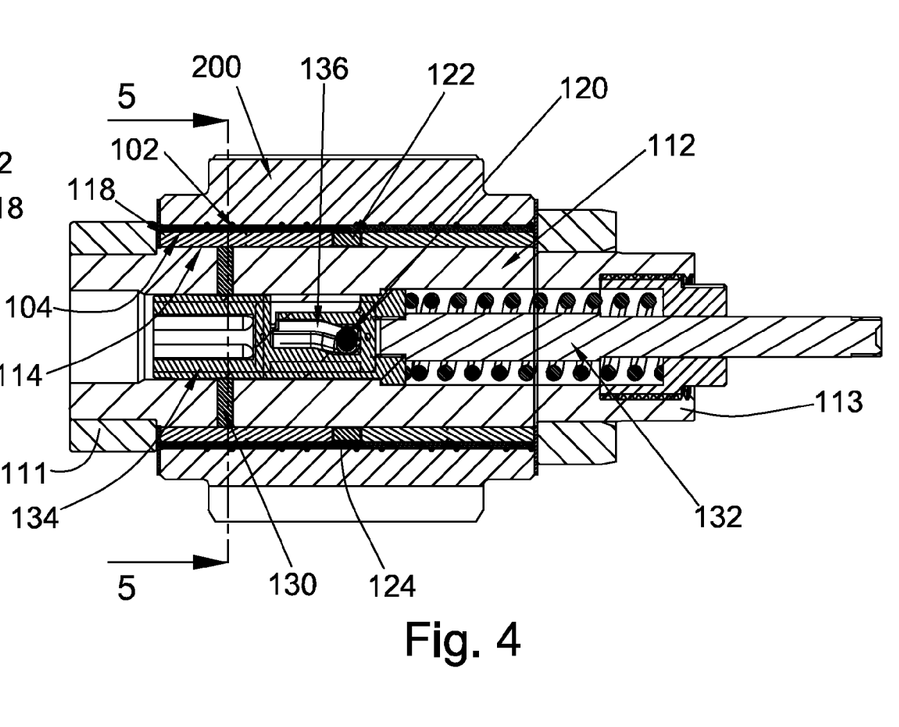
FIG. 4 is a section view of the bi-directional clutch assembly of FIG. 2.
Figure 5:
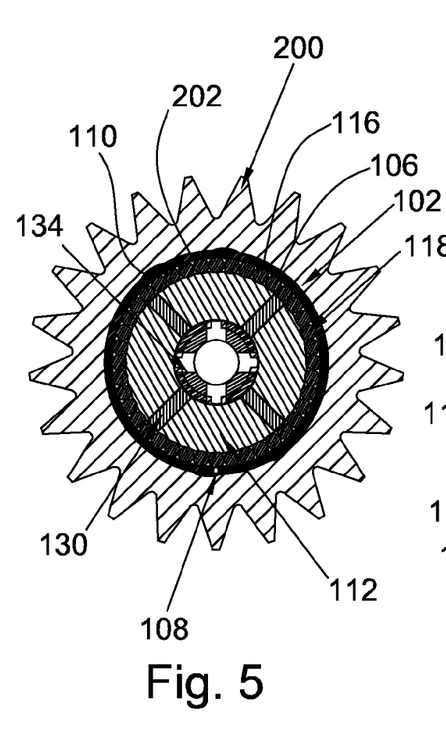
FIG. 5 is a section view of the bi-directional clutch assembly of FIG. 2 taken generally along line 5-5 in FIG. 4.

The following description is made with reference to FIGS. 2-5. FIG. 2 is a perspective view of bi-directional clutch 100 assembled with gear 200 according to an example aspect herein. FIG. 3 is a section view of bi-directional clutch assembly 100 of FIG. 2 with a portion removed. FIG. 4 is a section view of bi-directional clutch assembly 100 of FIG. 2. FIG. 5 is a section view of bi-directional clutch assembly 100 of FIG. 2 taken generally along line 5-5 in FIG. 4.

In one example embodiment, bi-directional clutch assembly 100 is a multi-mode (e.g., a three-mode) overrunning bi-directional clutch. That is, in a three-mode example, clutch 100 is capable of operation with three modes as described below, in which clutch 100 is capable of operation in a freewheel mode, in a braking mode, or in a locked mode. Furthermore, clutch 100 may be multi-directional, such as, for example, bi-directional. That is, in one example, operation of clutch 100 is not dependent on rotation direction. For example, clutch 100 operates equally well under clockwise or counter-clockwise rotation.

Clutch 100 includes slipper ring 102. Ring 102 includes inner circumferential surface 104 with a plurality of concave recesses 106 (FIGS. 4 and 5). Ring 102 is split in one example embodiment. That is, ring 102 is discontinuous about its circumference at split portion (e.g., a gap, or discontinuous portion) 108. Split 108 allows ring 102 to expand radially so that outer circumferential surface 110 of ring 102 engages inner circumferential surface 202 of gear 200, as described below.

Clutch 100 further includes hub 112 concentric with and disposed radially inside of ring 102. Collars 111 and 113 are disposed radially outside of hub 112 and maintain axial position of interior components of clutch 100 and gear 200 relative to hub 112. Hub 112 includes outer circumferential surface 114 with a plurality of concave recesses 116. Rollers 118 are disposed radially between slipper ring 102 and hub 112 in respective pairs of slipper ring and hub concave recesses 106 and 116. Actuator pin 120 is radially displaceable to engage actuator ring 122, restricting relative circumferential motion of slipper ring 102 relative to hub 112.

Ring 102 includes axial protrusions 124 (FIG. 4) disposed in recesses 126 (FIG. 3) of actuator ring 122 so that ring 102 and ring 122 rotate together. Pin 120 is disposed in an aperture (not shown) in hub 112 so that pin 120 and hub 112 rotate together. Radial displacement of pin 120 engages aperture 128 in actuator ring 122 so that pin 120 and actuator ring 122 rotate together. Therefore, radial displacement of pin 120 circumferentially positions hub 102, slipper ring 112, and actuator ring 122 relatively so that rollers 118 are disposed in respective valleys of recesses 106 and 116.

Clutch 100 includes radially displaceable pistons 130 for transmitting a radial force to slipper ring 102 during a braking mode of clutch 100. That is, pistons 130 are disposed in hub 112 and engageable with rollers 118 to cause frictional engagement of slipper ring outer surface 110 with gear inner surface 202. Pistons 130 are displaced to engage rollers 118 by an actuator shaft, as described below. Although pistons 130 are shown engaged with slipper ring 102 through rollers 118, other example embodiments (not shown) may include pistons 130 engaged directly with slipper ring 102 or through other suitable elements besides rollers.

Figure 6:
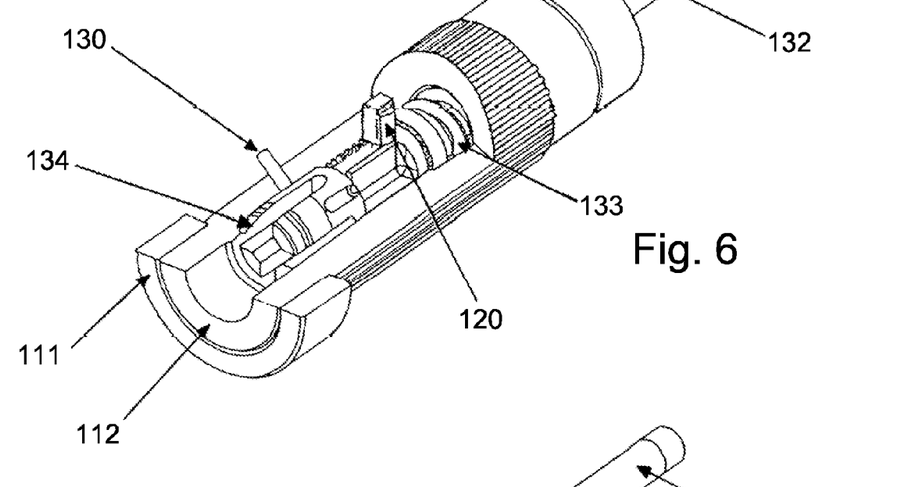
FIG. 6 is a partial section view of a portion of the bi-directional clutch assembly of FIG. 2 with a portion removed.
Figures 7, 7A:
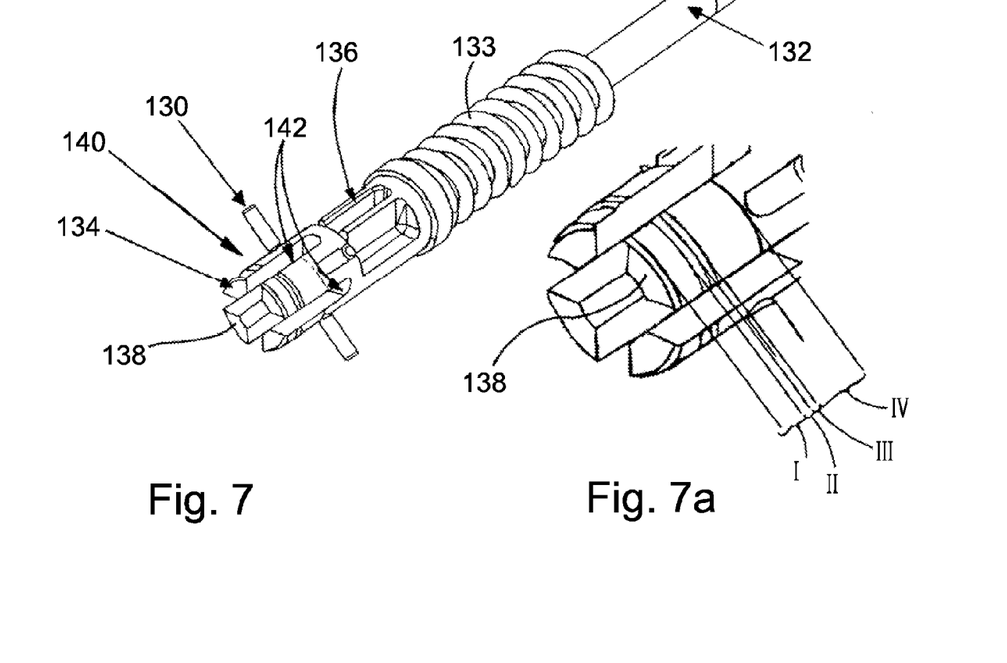
FIG. 7 is a detail view of an actuator shaft according to an example aspect herein.
FIG. 7a is a enlarged view of an end portion of the actuator shaft of FIG. 7.

The following description is made with reference to FIGS. 6, 7, and 7a. FIG. 6 is a section view of a portion of bi-directional clutch assembly 100 of FIG. 2 with a portion removed. FIG. 7 is a detail view of actuator shaft 132 according to an example aspect herein. FIG. 7a is an enlarged view of an end portion of the actuator shaft of FIG. 7. Actuator shaft 132 is disposed within hub 112. Optional spring 133 urges shaft 132 axially into a locking position of clutch 100 as described below. For example, if an external positioning device for shaft 132 malfunctions, spring 133 assures that clutch 100 will remain locked. In other example embodiments, spring 133 may be used to unlock clutch 100 if the positioning device malfunctions.

Shaft 132 includes engagement member 134 for applying radial force to pistons 130, and locking portion 136 for displacing actuator pin 120. Engagement member 134 includes resilient segment 138. In an example embodiment herein, resilient segment 138 includes a plurality of resilient segments, although in another example it can be a singular segment. Segment 138 may be formed from steel, aluminum, or plastic, for example and is radially flexible. That is, segment 138 is deflectable in the radial direction. Engagement member 134 includes tubular section 140 with circumferentially-offset axial slots 142. Resilient segment 138 is circumferentially disposed between a pair of axial slots 142.

Figure 8:
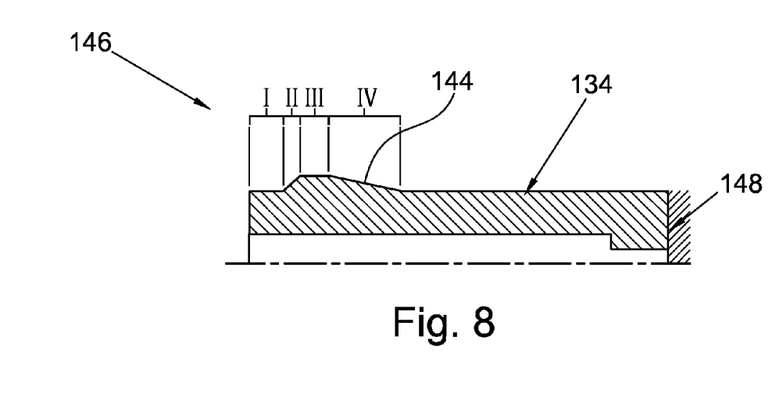
FIG. 8 is a cross-section view of an engagement member of the actuator shaft of FIG. 7.
Figure 9:
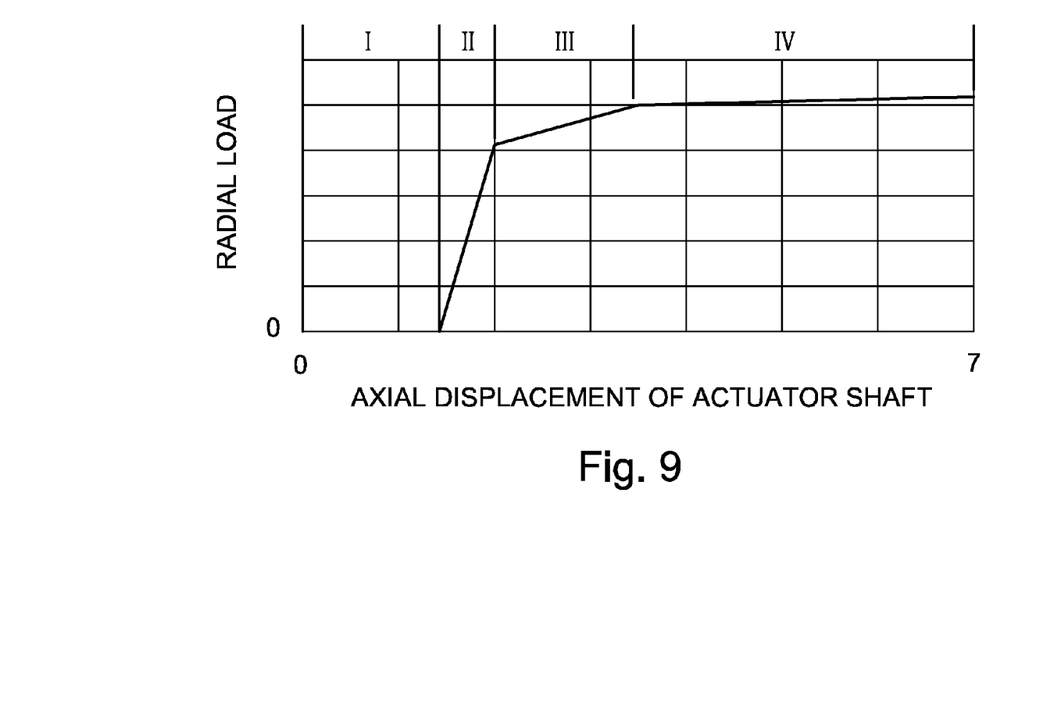
FIG. 9 is a plot of radial load vs. axial displacement of the actuator shaft of FIG. 7.

The following description is made with reference to FIGS. 8-9. FIG. 8 is a cross-section view of engagement member 134 of actuator shaft 132 of FIG. 7. FIG. 9 is a plot of radial load vs. axial displacement of actuator shaft 132 of FIG. 7. Segment 138 includes circumferential surface 144 with profile 146 to be engaged with radial piston 130 (FIG. 7). In an example embodiment herein, profile 146 is divided into plural segments, such as four segments labeled I, II, III, and IV in FIG. 8.

Segment I is a cylindrical portion that positions piston 130 in a clearance condition where slipper ring 102 is not frictionally engaged with gear 200. Segment II is a conical portion where piston 130 is positioned to engage rollers 118 to bring slipper ring 102 into contact with gear 200. Segment III is a cylindrical portion where piston 130 applies increasing radial force to rollers 118 as an axial position of piston 130 moves closer to fixed end 148 (i.e., non-slotted portion of actuator shaft 134), effectively shortening the length of the cantilever beam portion of segment 138 to increase radial force on piston 130. That is, the portion of profile 146 labeled III in FIG. 8 is arranged to apply an increasing force to piston 130 when actuator 132 is axially displaced relative to hub 112.

Segment IV is a conical portion where piston 130 applies constant radial force to rollers 118 as axial position of piston 130 moves closer to fixed end 148. That is, the portion of profile 146 labeled IV in FIG. 8 is arranged to apply a constant force to piston 130 when actuator 132 is axially displaced relative to hub 112. Because the effective length of the cantilever beam portion of segment 138 is decreasing, a constant, cylindrical surface would result in an increasing force at Segment IV. But the conical surface of Segment IV is arranged to counter the increasing radial force of the cantilever beam so that the radial force applied by piston 130 is constant.

An example of the radial force exerted by segment 138 on piston 130 is shown in FIG. 9. As can be seen by the graph, the amount of radial load is 0 when piston 130 is disposed on the cylindrical surface Segment I. Segment II shows a steep increase in radial load as piston 130 makes contact with slipper ring 102. Segment III shows a continuing increase in radial load as actuator shaft 132 is displaced further. This is the braking portion where friction force from piston 130 acting on slipper ring 102 begins to synchronize the rotational speed of hub 112 and gear 200; that is, the speed of hub 112 and gear 200 approach equilibrium. Segment IV shows a substantially constant radial force as actuator shaft 132 is axially displaced a further amount allowing radial displacement of actuator pin 120 and locking of clutch 100.

Figures 10A, 10B:
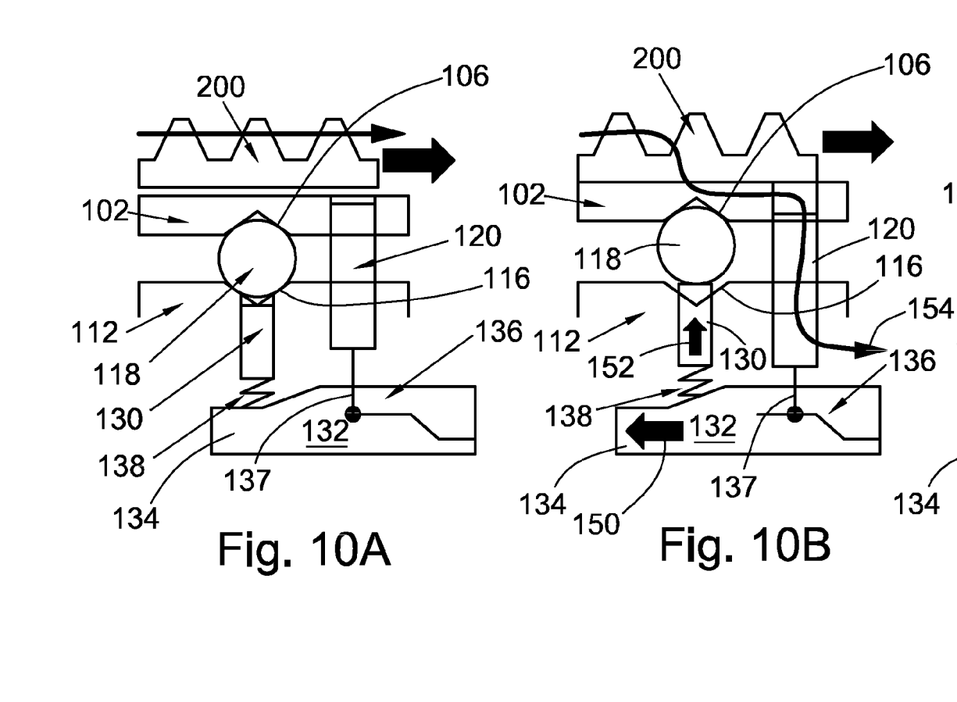
FIG. 10A is a schematic diagram depicting a first, freewheeling mode of an overrunning bi-directional clutch.
FIG. 10B is a schematic diagram depicting a second, braking mode of the overrunning bi-directional clutch; and, FIG. 10C is a schematic diagram depicting a third, locking mode of the overrunning bi-directional clutch.
Figure 10C:
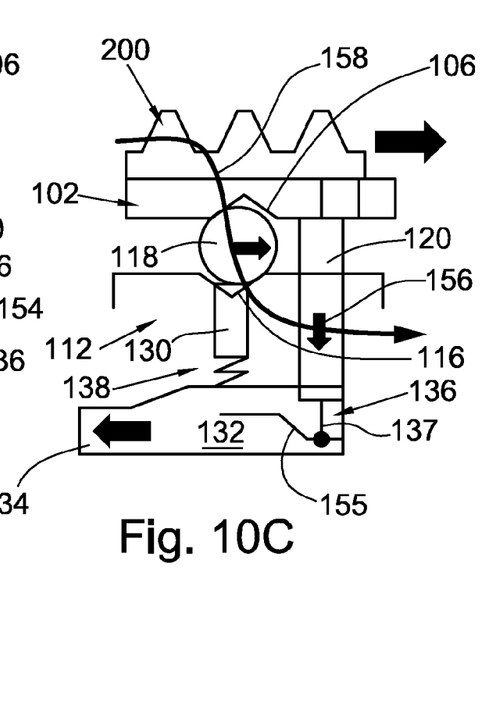

The following description is made with reference to FIGS. 10A-10C. FIG. 10A is a schematic diagram depicting a first, freewheeling mode of an overrunning bi-directional clutch. FIG. 10B is a schematic diagram depicting a second, braking mode of the overrunning bi-directional clutch. FIG. 10C is a schematic diagram depicting a third, locking mode of the overrunning bi-directional clutch. As shown in FIG. 10A, actuator pin 120 is at a raised position aligning slipper ring 102 and hub 112 so that roller 118 is disposed in recesses 106 and 116 of ring 102 and hub 112, respectively. Pin 120 is shown schematically engaged with locking portion 136 by line 137. Piston 130 is disposed radially inward and is not exerting a force on roller 118. Resilient segment 138 is shown schematically as a spring in FIGS. 10A-10C, though it should be understood that segment 138 may be a radially displaceable segment of engagement member 134 as described above. Moving to FIG. 10B, as actuator shaft 132 is moved in direction of arrow 150, piston 130 is displaced radially outward by segment 138 (Segments II and III in FIG. 8) in direction of arrow 152, urging roller 118 towards slipper ring 102. Ring 102 first contacts gear 200 (Segment II) and then exerts radial force on gear 200 (Segment III) so that a portion of torque in gear 200 is transmitted to hub 112 through pin 120 as indicated by arrow 154. Pin 120 remains disposed radially outward so that ring 102 and hub 112 remain aligned. Further axial motion of shaft 132 aligns pin 120 with a deeper portion of the hub aperture (indicated by line 155 in FIG. 10C), displacing pin 120 radially inward in direction of arrow 156 and allowing displacement of ring 102 relative to hub 112. Relative displacement of ring 102 and hub 112 locks clutch 100 through operation of roller 118 in recesses 106 and 116 as described above. In this condition, all torque from gear 200 is transferred to hub 112 through slipper ring 102 and roller 118, as indicated by arrow 158.

Actuator shaft 132 provides a compact engagement device for clutch 100. Furthermore, pistons 130 add a braking portion to the operation of clutch 100, slowing engagement time for a smoother torque transmission.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. An actuator for operating a multi-mode overrunning multi-directional clutch, the actuator comprising:
an axially displaceable shaft including a central axis;
an engagement member coaxial with and connected to the shaft and including at least one resilient segment for displacing a piston to engage the clutch; and,
a locking portion coaxial with and connected to the shaft for displacing an actuator pin to lock the clutch.

2. The actuator of claim 1, wherein the clutch is a three-mode overrunning bi-directional clutch.

3. The actuator of claim 1, wherein the at least one resilient segment is radially flexible and extends in a direction parallel to the central axis.

4. The actuator of claim 3, wherein the engagement member comprises a tubular section with a plurality of circumferentially-offset slots extending parallel to the central axis, and wherein the at least one resilient segment is disposed between corresponding slots.

5. The actuator of claim 4, wherein the at least one resilient segment includes a surface having a profile, and at least a portion of the profile is arranged to apply an increasing force to the piston when the shaft is axially displaced relative to a hub for the clutch.

6. The actuator of claim 5, wherein another portion of the profile is arranged to apply a constant force to the piston when the shaft is axially displaced relative to a hub for the clutch.

7. The actuator of claim 1, wherein the locking portion is arranged to displace the actuator pin.

8. A multi-mode overrunning multi-directional clutch comprising:
a split tubular slipper ring including a surface having a plurality of recesses formed therein;
a hub concentric with the slipper ring and including a surface having a plurality of recesses formed therein;
a plurality of rollers disposed radially between the slipper ring and the hub in the slipper ring and hub recesses;
a plurality of radially displaceable pistons for transmitting an applied radial force to the slipper ring; and,
an actuator shaft including an engagement member with at least one radially flexible resilient segment for applying the radial force to the pistons for being transmitted to the slipper ring.

9. The clutch of claim 8, wherein the clutch is a three-mode overrunning bi-directional clutch.

10. The clutch of claim 8, further comprising a radially displaceable actuator pin for selectively restricting relative circumferential motion between the slipper ring and the hub, wherein the actuator shaft includes a locking portion for displacing the actuator pin.

11. The clutch of claim 8, wherein the engagement member comprises a tubular section with a plurality of circumferentially-offset axial slots, and wherein the at least one resilient segment is disposed between corresponding axial slots.

12. The clutch of claim 11, wherein the at least one resilient segment includes a surface having a profile, and at least a portion of the profile is arranged to apply an increasing force to the plurality of pistons when the actuator shaft is axially displaced relative to the hub.

13. The clutch of claim 12, wherein another portion of the profile is arranged to apply a constant force to the plurality of pistons when the actuator shaft is axially displaced relative to the hub.

14. A method of operating a slipper clutch comprising:
axially displacing a shaft including a resilient segment to a first position;
radially displacing a piston towards a slipper ring of the slipper clutch with the shaft resilient segment to apply a radial force to the slipper ring to engage the clutch.

15. The method of claim 14, further comprising:
axially displacing the shaft to a second position; and,
radially displacing an actuator pin away from the slipper ring to allow relative movement between the slipper ring and a hub to lock the clutch.

16. The method of claim 15, wherein the actuator pin is disposed in a locking portion of the shaft.

* * * * *